United States Patent
Bergur et al.

(10) Patent No.: US 12,128,349 B2
(45) Date of Patent: Oct. 29, 2024

(54) METHOD AND A SYSTEM FOR ABATING $H_2S$ AND $CO_2$ FROM $H_2S$ AND $CO_2$ RICH GAS MIXTURES SUCH AS GEOTHERMAL NON-CONDENSABLE GAS MIXTURES

(71) Applicant: CARBFIX [IS]/[IS], Reykjavík (IS)

(72) Inventors: Sigfússon Bergur, Reykjavík (IS); Arnarson Þór Magnús, Reykjavik (IS); Gunnarsson ngvi, Reykjavik (IS); Gunnarsson Teitur, Reykjavik (IS); Einarsson Garđar Jóhann, Garđabær (IS)

(73) Assignee: Carbfix (Reykjavik, IS) (IS)

( * ) Notice: Subject to any disclaimer, the term of this patent is extended or adjusted under 35 U.S.C. 154(b) by 0 days.

(21) Appl. No.: 17/753,688

(22) PCT Filed: Sep. 17, 2020

(86) PCT No.: PCT/EP2020/076005
§ 371 (c)(1),
(2) Date: Aug. 2, 2022

(87) PCT Pub. No.: WO2021/053084
PCT Pub. Date: Mar. 25, 2021

(65) Prior Publication Data
US 2022/0339576 A1      Oct. 27, 2022

(30) Foreign Application Priority Data

Sep. 17, 2019   (EP) ..................................... 19197831

(51) Int. Cl.
*E21B 43/40*     (2006.01)
*B01D 53/14*     (2006.01)
(Continued)

(52) U.S. Cl.
CPC ....... *B01D 53/1462* (2013.01); *B01D 53/526* (2013.01); *E21B 41/0057* (2013.01);
(Continued)

(58) Field of Classification Search
CPC ....... E21B 41/0057; E21B 43/40; E21B 43/35
See application file for complete search history.

(56) References Cited

U.S. PATENT DOCUMENTS

| | | |
|---|---|---|
| 5,085,782 A | 2/1992 | Gallup et al. |
| 5,340,382 A | 8/1994 | Beard |
| 5,694,772 A | 12/1997 | Weinberg et al. |

OTHER PUBLICATIONS

International Search Report issued in PCT/EP2020/076005 filed Sep. 12, 2020 dated Mar. 25, 2021.
(Continued)

*Primary Examiner* — Catherine Loikith
(74) *Attorney, Agent, or Firm* — Vincent K. Shier

(57) ABSTRACT

A method and a system for abating hydrogen sulfide ($H_2S$) and carbon dioxide ($CO_2$) from $H_2S$ and $CO_2$ rich gas mixtures such as geothermal non-condensable gas mixtures (NCG). The $H_2S$ and $CO_2$ gas is separated from the remaining gases contained in the $H_2S$ and $CO_2$ rich gas mixtures by pressurizing the gas stream and feeding it into an absorption column where $H_2S$ and $CO_2$ are preferentially dissolved in a water stream, resulting in water stream rich in $H_2S$ and $CO_2$. The $H_2S$ and $CO_2$ rich water stream may then be re-injected into a geological reservoir or used for pH modification of another water stream of geological origin.

26 Claims, 4 Drawing Sheets

(51) Int. Cl.
*B01D 53/52* (2006.01)
*E21B 41/00* (2006.01)

(52) U.S. Cl.
CPC ........ *E21B 43/40* (2013.01); *B01D 2257/304* (2013.01); *B01D 2257/504* (2013.01); *B01D 2258/02* (2013.01)

(56) References Cited

OTHER PUBLICATIONS

International Preliminary Report on Patentability issued in PCT/EP2020/076005 filed Sep. 12, 2020 dated Jan. 31, 2021.
Written Opinion issued in PCT/EP2020/076005 filed Sep. 12, 2020 dated Mar. 25, 2021.
Australian Examination Report in Application No. 2020351052, dated Nov. 22, 2022.
Australian Notice of Acceptance in Application No. 2020351052, dated May 25, 2023.

| Location | Power (GWh) | CO$_2$ (tonn/yr) | H$_2$S (ton/yr) |
|---|---|---|---|
| Svartsengi | 363.8 | 34,733 | 659 |
| Reykjanes | 849.3 | 25,571 | 927 |
| Nesjavellir | 1028.2 | 15,412 | 10,275 |
| Hellisheiði | 780.2 | 24,211 | 6,902 |
| Krafla | 526.1 | 49,418 | 5,309 |
| Námafjall | 18.9 | 2,016 | 1,223 |

METHOD AND A SYSTEM FOR ABATING H₂S AND CO₂ FROM H₂S AND CO₂ RICH GAS MIXTURES SUCH AS GEOTHERMAL NON-CONDENSABLE GAS MIXTURES

FIELD OF THE INVENTION

The present invention relates to a method for abating hydrogen sulfide ($H_2S$) and carbon dioxide ($CO_2$) from gas-mixtures rich in $H_2S$ and $CO_2$ such as geothermal non-condensable gas-mixtures (NCG).

BACKGROUND OF THE INVENTION

Conventional geothermal plants utilize the heat of the earth by extracting a hot mixture of steam and brine (geothermal water) from a geothermal reservoir, characterized by a thermal anomaly, permeable rock and fluid (Barbier, E. (2002) *Geothermal Energy Technology and Current Status: an Overview. Renewable and Sustainable Energy Reviews*, 6, p. 3-65). The fluids extracted from these geothermal reservoirs naturally contain dissolved gases such as $CO_2$, $H_2S$, $H_2$, $N_2$, $CH_4$ etc. These gases are a by-product of the geothermal energy production and are of magmatic origin. The geothermal steam is separated from the brine (geothermal water) so it can be used for electrical generation by power turbines. Following this process, the steam is condensed and re-injected into the geothermal reservoir with the brine (geothermal water). However, only a portion of the gases originally part of the hot mixture extracted from the geothermal reservoir re-condense with the steam, leaving the rest, so-called Non-Condensable gases (hereinafter NCG or NCG mixture), as a gaseous by-product of the thermal energy production. These gases are normally removed from the condenser by vacuum pumps or ejectors and vented into the atmosphere. Thus, currently most geothermal plants in e.g. Iceland vent substantial amounts of $H_2S$ and $CO_2$ into the atmosphere. FIG. 1 shows the amount of $CO_2$ and $H_2S$ emitted by several geothermal power plants in Iceland. The amount of gases emitted does not depend solely on the size of the plant, but also on the geology of the location.

Based on the above, it is easily understood that the emission of $CO_2$ and $H_2S$ from geothermal power plants is one of the main environmental concerns of geothermal energy utilization. $CO_2$ is a so-called greenhouse gas contributing to global warming and hydrogen sulfide is a colorless, flammable and highly toxic gas with the characteristic odor of rotten eggs. Exposure to $H_2S$ can cause health problems depending on levels and duration of exposure. Low level, prolonged exposure can cause inflammation and irritation of the eyes whereas high levels of exposure for brief periods of time can cause dizziness, headache, nausea and even death if the concentration of $H_2S$ in atmosphere goes above 300 ppm.

Concentration of $H_2S$ in geothermal fluids is usually in the range of few ppb to several hundred ppm (Arnórsson, S. (1995a) *Hydrothermal systems in Iceland. Structure and conceptual models. 1. High-temperature areas. Geothermics* 24, 561-602, Arnórsson, S. (1995b) *Hydrothermal systems in Iceland. Structure and conceptual models. 2. Low-temperature areas. Geothermics* 24, 603-629). During utilization of high temperature geothermal fluids the $H_2S$ is concentrated in the steam phase and subsequently released into atmosphere after the steam condenses. The $H_2S$ is released on top of the cooling towers where it is dispersed to the air in order to lower the risk of high concentration of $H_2S$ close to the power station. The $H_2S$ along with other gases such as $CO_2$, $H_2$, $N_2$, $CH_4$ contained in the exhaust gas is carried by winds away from the site of the power plant and can in some weather conditions cause foul smell in nearby communities.

Several methods have to date been implemented in an attempt to dispose of gases such as $H_2S$ and $CO_2$ from the exhaust. These methods include burning the gas, or separating the $H_2S$ from the other gases and subsequently oxidizing it. Another known way of disposing of these gases is by mixing the entire non-condensable gas stream with water. As the solubility of the different gases in the non-condensable gas stream varies considerably, this will, however, in many situations require very large amounts of water. For example at 293 K (app 20 C) and 1 atmosphere (app 1 bar) the solubility of the relatively soluble $CO_2$ and $H_2S$ is 0.169 g and 0.385 g per 100 g of water, respectively, whereas that of the relatively poorly soluble $H_2$, $N_2$, $O_2$, Ar and $CH_4$ is only 0.00016, 0.0019, 0.0043, 0.0062 and 0.0023 g per 100 g of water, respectively.

U.S. Pat. No. 5,656,172 describes a method for producing an $H_2SO_4$-comprising aqueous brine (geothermal water) from geothermal non-condensable gases with the purpose of producing an acid brine (geothermal water) that can be used to dissolve scale and other precipitates and/or inhibit further mineralization in the context of geothermal energy production. Such a brine (geothermal water) is, however, not in itself useful for direct re-injection into and storage of $H_2S$ and $CO_2$ in geological formations as is contemplated by the present invention. Since $H_2SO_4$ is a strong acid, only a small amount is needed to acidify the brine (geothermal water) compared to using $H_2S$ which is weak acid. Therefore only small portion of the sulfur emissions from a geothermal power plant can be abated before extensive measures are needed to mitigate corrosion of the steel piping of the re-injection system and casings of re-injection wells.

US20020062735 discloses a process of pre-treating natural gas, i.e. a gas primarily consisting of $CH_4$ and intended for e.g. heating and cooking. The process described is aimed at pre-treating the natural gas by purifying it from its relatively low content of $H_2S$ and $CO_2$ so that the natural gas can be used and marketed without harming the environment. Accordingly, neither the methods nor the systems described in US20020062735 are aimed at how to dispose of $H_2S$ and $CO_2$ from $H_2S$ and $CO_2$ rich gases, such as the above-mentioned NCG, which is a by-product of geothermal energy production and is much richer in $H_2S$ and $CO_2$ than natural gas, nor does it provide a solution that would enable methods or systems for such a disposal.

US2011225971 describes a method for removing hydrogen sulfide from the steam condensate of a geothermal power generating unit, by bringing this into contact with the condenser vent gas of the same geothermal power generating unit comprising carbon dioxide. Thus, the methods described relate to removing the $H_2S$ from the condensate rather than the $H_2S$ from the NCG mixture and do in any event not rely on absorption of the $H_2S$ and the $CO_2$ of the NCG mixture into the steam condensate or any other water stream as contemplated by the present invention.

U.S. Pat. No. 5,340,382 describes a method for absorption of an acid gas (which is explained as a mixture of carbon dioxide and hydrogen sulfide) into water from hydrocarbon wells. According to U.S. Pat. No. 5,340,382 the acid gas is to be absorbed into the water by use of a static mixer, following which this mixture is then pressurized to flow through a pipeline to an injection pump, through which it is returned into disposal strata. According to U.S. Pat. No. 5,340,382 the water with the acid gas is to be maintained at a pressure higher than the pressure at the exit of the static mixer. It is quite clear from U.S. Pat. No. 5,340,382 that the methods described therein relate to the compression and absorption of an (acid) gas mixture consisting solely of $H_2S$ and the $CO_2$, rather than, as in the context of the present invention, the compression of a NCG mixture, encompassing both $CO_2$ and $H_2S$ and at least one of also $H_2$, $N_2$, $O_2$, Ar and $CH_4$. Thus, the methods described in U.S. Pat. No. 5,340,382 are not aimed at the selective absorption of the relatively soluble $CO_2$ and $H_2S$ gas from a NCG mixture into a liquid steam condensate (or any other water stream) while at the same time leaving the relatively poorly soluble $H_2$, $N_2$ and $CH_4$ gases in the NCG mixture as are the methods of the present invention. The methods of U.S. Pat. No. 5,340,382, thus, presupposes that the $H_2S$ and $CO_2$ making up the so-called acid gas has already been separated from any other gasses, while the methods of the present invention are aimed at doing exactly that, i.e. separating $H_2S$ and $CO_2$ in a gas mixture from any other gasses present in that mixture. That the methods described in U.S. Pat. No. 5,340,382 do not contemplate any separation of gases in a NCG mixture is also very clear from the fact that after the so-called acid gas has been mixed with water in the so-called static mixer, this mixture is according to U.S. Pat. No. 5,340,382 to be kept pressurized and directly injected into disposal strata without any gas breaking out of the liquid (cf. column 3 1. 62 to column 1. 34). Thus, unlike in the methods of the present invention, the methods of U.S. Pat. No. 5,340,382 do no contemplate having both a gas stream and a water stream exiting from the mixing unit (the so-called static mixer in U.S. Pat. No. 5,340,382), but only one single stream comprising both the water and the gas. This difference is also very clear from the fact that according to the teachings of U.S. Pat. No. 5,340,382 (cf. column 2 1. 22-24) a static mixer is to be used rather than e.g. an absorption tower, which is on the other hand a preferred way of performing the methods according to the present invention.

U.S. Pat. No. 5,340,382 describes a method for disposing of hydrogen sulfide present in geothermal fluid used in a geothermal plant of the type that produces a gaseous stream that includes hydrogen sulfide and a stream of spent geothermal liquid, which comprises compressing both the spent geothermal liquid and the gaseous stream and bringing these into contact to produce a stream of pressurized gases substantially free of hydrogen sulfide, and a liquid effluent. The methods described rely on the compression of the gas mixture before bringing this into contact with the steam condensate in a so-called packed tower in what must be understood to be a kind of extraction, which does not result in an absorption of both the $H_2S$ and the $CO_2$ of the gaseous NCG mixture into the liquid steam condensate or any other water stream as contemplated by the present invention. That the methods contemplated in U.S. Pat. No. 5,694,772 cannot be said to be relying on an absorption of both the hydrogen sulfide and the carbon dioxide into the steam condensate is supported by the fact that according to both the figures (FIG. 1) and text (column 4, lines 53-56) of U.S. Pat. No. 5,694,772 any $CO_2$ will remain part of the compressed gas stream, which is subsequently vented to the atmosphere. Thus, the solution described in U.S. Pat. No. 5,694,772 is clearly not aimed at separating both the $H_2S$ and the $CO_2$ from the NCG mixture but rather only the $H_2S$. Also, U.S. Pat. No. 5,694,772 mentions that the methods described therein can be optimized by the addition of chlorine to the above-mentioned so-called packed tower. The addition of chlorine can only be understood to be aimed specifically at an increased oxidation of the hydrogen sulfide into other sulfur-species having a higher solubility in aqueous solution. In contrast simple absorption will not involve a change in the chemical species present in the system. Also, the suggestion to add chlorine in connection with the methods of U.S. Pat. No. 5,694,772 clearly shows that these are aimed only at disposing of the $H_2S$ in the gas mixture and not any $CO_2$ possibly also present. In fact as the solubility of chlorine in water at 293 K (app 20 C) and 1 atmosphere (app 1 bar) is higher (app. 0.7 g per 100 g of water) than that of $CO_2$ (0.169 g per 100 g of water) and as there is no similar oxidative role of chlorine vis-à-vis $CO_2$ (as that mentioned for hydrogen sulfide above) adding chlorine to the above-mentioned so-called packed tower would be believed to lower the overall absorption of $CO_2$ into the liquid stream if at all happening in the first place (i.e. in a system without chlorine).

U.S. Pat. No. 4,244,190 describes a method for treating a two-phase geothermal brine (geothermal water) produced from a subterranean geothermal reservoir containing non-condensable gases, including hydrogen sulfide and heavy and/or transition metals in solution, which involves converting the hydrogen sulfide to sulfur and/or other sulfur compounds of a higher oxidized state. Thus, the methods described relate to removing the $H_2S$ by converting this to a higher oxidized state and do in any event not rely on absorption of the $H_2S$ and the $CO_2$ of the NCG mixture into the steam condensate or any other water stream as contemplated by the present invention.

WO9322032 describes a method for treating a gas comprising ammonia and hydrogen sulfide constituents, which involves increasing the pH of an oxygenated liquid by adding ammonia or an ammonia precursor thereto and contacting said gas in a mixing zone with the pH-increased-liquid under conditions sufficient to remove a substantial portion of said hydrogen sulfide. Thus, the methods described relate to removing the $H_2S$ from gaseous mixtures comprising substantial amounts of ammonia rather than the typical composition of NCG from geothermal reservoirs and do in any event not rely on absorption of the $H_2S$ and the $CO_2$ of the NCG mixture into the steam condensate or any other water stream as contemplated by the present invention.

U.S. Pat. No. 5,085,782 describes a method for recovering and using non-condensable gases produced during flashing of a geothermal brine (geothermal water), said gases comprising a major amount of $CO_2$ and a minor amount of $H_2S$, which comprises introducing said non-condensable gases into a condensate of steam derived from the brine (geothermal water) in the presence of an oxidizing agent in order to oxidize substantially all of the hydrogen sulfide. Thus, the methods described relate to removing the $H_2S$ by converting this to a higher oxidized state rather than on absorption into the steam condensate or any other water stream as contemplated by the present invention.

The inventors of the present invention have thus for the first time described systems and methods that met the need for an environmentally friendly method for separating, capturing and preparing $H_2S$ and $CO_2$ from NCG for later storage, or for later use relying solely on the absorption of the relatively soluble $CO_2$ and $H_2S$ gas from the NCG mixture into the liquid steam condensate (or any other water stream) without relying on e.g. the addition of chlorine for oxidizing the sulfur to a higher oxidation state and at the same time leaving the relatively poorly soluble $H_2$, $N_2$ and $CH_4$ gases in the NCG mixture.

SUMMARY OF THE INVENTION

As set out above, it would be advantageous to achieve an effective and environmentally friendly method for separating soluble gases including hydrogen sulfide ($H_2S$) and carbon dioxide ($CO_2$) from $H_2S$ and $CO_2$ rich gases containing at least also one of $H_2$, $N_2$, $CH_4$ and/or Ar gases, such as geothermal non-condensable gas (NCG) mixtures, with the aim of preparing hydrogen sulfide ($H_2S$) and carbon dioxide ($CO_2$) for disposal or later use. In general, the present invention mitigates, alleviates or eliminates one or more of the above mentioned disadvantages of $H_2S$ and $CO_2$ separately or in any combination. In particular, it may be seen as an object of the present invention to provide a method that solves the above mentioned problems, or other problems, of the prior art associated with $H_2S$ and $CO_2$.

To better address one or more of these concerns, in a first aspect of the invention a method is provided for capturing soluble gases including $H_2S$ and $CO_2$ from a $H_2S$ and $CO_2$ rich gas mixture (G1) containing at least also one of $H_2$, $N_2$, $CH_4$ and/or Ar gases, such as NCG, comprising at least the following:

pressurizing said $H_2S$ and $CO_2$ rich gas mixture (G1) containing at least also one of $H_2$, $N_2$, $CH_4$ and/or Ar gases, such as NCG, to a pressure of between 3 and 20 bar, e.g. between 3 and 15 bar, and contacting a stream of said pressurized gas mixture (G1), encompassing $H_2S$ and $CO_2$ and at least also one of $H_2$, $N_2$, $CH_4$ and/or Ar, with a stream of water (W2), absorption of at least part of said $H_2S$ and $CO_2$ from said pressurized gas mixture (G1), encompassing $H_2S$ and $CO_2$ and at least also one of $H_2$, $N_2$, $CH_4$ and/or Ar, into said water stream (W2), thereby producing a stream of water (W4) enriched with dissolved $H_2S$ and $CO_2$ comparable to said water stream (W2) and a stream of pressurized gas (G3), which has been depleted of $H_2S$ and $CO_2$ compared to said gas mixture (G1) encompassing $H_2S$ and $CO_2$ and at least also one of $H_2$, $N_2$, $CH_4$ and/or Ar, transferring said water stream (W4) enriched with dissolved $H_2S$ and $CO_2$:
either to an injection well for injecting said water stream (W4) into a geological reservoir, or
to a system for injection of a water stream (W5) into a geological reservoir for use of said water stream (W4) as an aid for pH-regulation of said water stream (W5)

In the context of the present invention the term transferring is to be understood as any means of transferring a liquid, e.g. water, or a gas (e.g. a gas mixture) from one location to another, e.g. by pumping.

In the context of the present invention the term stream is to be understood as a substance, e.g. water or gas, moving in a given direction at a given velocity at a certain flow rate, which may be provided as either a volumetric flow rate or a mass flow rate. Volumetric flow rate is the volume of fluid or gas which passes a given point per unit time and is usually represented by the symbol Q (sometimes V). The SI unit for volumetric flow rate is $m^3/s$. Thus, Volume flow rate equals Volume/time. Mass flow rate on the other hand is the mass of fluid or gas which passes a given point per unit time. The SI unit for mass flow rate is kg/s.

In the context of the present invention the term water source or water is to be understood as any kind of water, such as e.g. groundwater, ocean/sea-water, spring water, geothermal condensate or brine (geothermal water), or surface waters from rivers, streams or lakes.

In the context of the present invention the term injection well is to be understood as any kind of structure providing for a possibility of placing fluids or gases either deep underground or just into the ground in a downwardly direction, such as e.g. a device that places fluid into rock formations, such as basalt or basaltic rock, and porous rock formations, such as sandstone or limestone, or into or below the shallow soil layer.

In the context of the present invention a $CO_2$ and/or $H_2S$ rich gas mixture is to be understood as any gas mixture of which the relative content of $CO_2$ and/or $H_2S$ is higher than the relative content of $CO_2$ and/or $H_2S$ of atmospheric air.

In the context of the present invention the term hydraulic pressure is to be understood as the pressure of a hydraulic fluid which it exerts in all direction of a vessel, well, hose or anything in which it is present. A hydraulic pressure may give rise to flow in a hydraulic system as fluid flows from high pressure to low pressure.

Pressure is measured in the SI unit pascal (Pa), i.e. one newton per square meter (1 $N/m^2$) or 1 $kg/(m\ s^2)$, or 1 $J/m^3$. Other units of pressure commonly used are pound per square inch or, more accurately, pound-force per square inch (abbreviation: psi) and bar. In SI units, 1 psi is approximately equal to 6895 Pa and 1 bar is equal to 100,000 Pa.

In the context of the present invention the term partial pressure or just pressure of a gas (of the $CO_2$ and/or $H_2S$) is to be understood as the notional pressure of said given gas in a mixture of gases, if this given gas in itself occupied the entire volume of the original mixture at the same temperature. The total pressure of an ideal gas mixture is the sum of the partial pressures of the individual constituent gases in the mixture.

In the context of the present invention the terms pressurize and pressurized is to be understood as the process of bringing to and maintaining, respectively, a pressure higher than that of the surroundings, e.g. higher than atmospheric pressure, such as between 3 and 20 bar, such as between 3 and 15 bar, such as between 4 and 10 bar, such as between 6 and 8 bar, e.g. 7 bar. Notably, the terms pressurize and pressurized are in the context of the present invention not to be construed as meaning compressing a given gas or a given gas mixture into its liquid state, which would at a given temperature for a given gas or a given gas mixture imply subjecting it to a pressure above a certain threshold value.

In the context of the present invention the term contacting, e.g. contacting a stream of gas with a stream of water, is to be understood as bringing something into contact with something else, i.e. to cause two or more things to touch, physically interact or associate with one another.

In the context of the present invention the term absorption, e.g. absorption of a gas into water, is to be understood as a physical or chemical phenomenon or process in which atoms, molecules or ions enter a bulk phase, e.g. liquid or solid material. One example of this would be gas-liquid absorption, (also known as scrubbing), which is an operation in which a gas mixture is contacted with a liquid for the purpose of preferentially dissolving one or more components of the gas mixture and to provide a solution of them in the liquid. In principle there are 2 types of absorption processes: physical absorption and chemical absorption, depending on whether there is any chemical reaction between the solute and the solvent (absorbent). In processes like the ones of the present invention, where water is used as absorbent, chemical reactions only rarely occur between the absorbent and the solute, and the process is, thus, commonly referred to as physical absorption. However, in processes where the pH of the water absorbent has been modified by adding a base or an acid, absorption in water may, depending on the chemical nature of the solute, be accompanied by a rapid and irreversible neutralization reaction in the liquid phase and the process may then be referred to as chemical absorption or reactive absorption. Thus, chemical reactions caused e.g. by pH-modification can be used to increase the rate of absorption, increase the absorption capacity of the solvent, increase selectivity to preferentially dissolve only certain components of a gas mixture, and/or convert a hazardous component of a gas mixture to a safe or safer compound.

In the context of the present invention the term producing, e.g. producing a stream of water or stream of pressurized gas, is to be understood as giving rise to, cause, create, bring forth, or yield something, e.g. a stream of water or a stream of pressurized gas.

In the context of the present invention injecting/reinjecting or inject/reinject is to be understood as introducing/reintroducing something forcefully into something else, e.g. to force a fluid into an underground structure.

In the context of the present invention the term geological reservoir is to be understood as fractures in an underground structure, e.g. basaltic rock, that expands in other directions than upwardly and downwardly, which structure provides a flow path for the water injected into an injection well according to the present invention and may include what is referred to as a geothermal reservoir. In the present context the term geothermal reservoir is to be understood as fractures in hot rock that expand in other directions than upwardly and downwardly and provide a flowing path for the injected water from a well.

Accordingly, a method is provided that separates the $CO_2$ and $H_2S$ from the remaining gases of e.g. the NCG by producing a stream of water (W4) enriched with dissolved $H_2S$ and $CO_2$ and thus prepares these gases for later disposal or for use in e.g. pH modification of fluids. The disposal may e.g. be based on injecting the stream of water (W4) enriched with dissolved $CO_2$ and $H_2S$ back into a geothermal reservoir where they form chemical bindings via water-rock reactions. Thus, water-rock reactions that are already taking place in natural geothermal systems may be utilized by means of injecting the stream of water (W4) enriched with dissolved $H_2S$ and $CO_2$ back into the geothermal system. Separating the $CO_2$ and $H_2S$ by dissolving it in a water stream and returning it back to where it came from has to be considered as an ideal method for reducing gas emissions from e.g. geothermal power plants In one embodiment, said $H_2S$ and $CO_2$ rich gas further comprises at least one of following gases: $H_2$, $N_2$, $CH_4$, and/or Ar, and said method of abating the $H_2S$ and $CO_2$ gas from the remaining gases contained in the $H_2S$ and $CO_2$ rich gas includes conducting the $H_2S$ and $CO_2$ rich gas containing at least also one of said $H_2$, $N_2$, $CH_4$ and/or Ar gases through an absorption column where the $H_2S$ and $CO_2$ is brought into contact with a water, so as to separate the dissolved $H_2S$ and $CO_2$ from the remaining poorly soluble $H_2$, $N_2$, $CH_4$ and/or Ar gases. In that way, a simple way is provided for separating the $H_2S$ and $CO_2$ from said remaining poorly soluble gases.

In a second aspect of the invention, a system is provided for separating soluble gases including hydrogen sulfide ($H_2S$) and carbon dioxide ($CO_2$) from a $H_2S$ and $CO_2$ rich gas mixture (G1) containing at least also one of $H_2$, $N_2$, $CH_4$ and/or Ar gases, such as geothermal non-condensable gas (NCG), comprising at least the following:

means for pressurizing said gas mixture (G1), encompassing $H_2S$ and $CO_2$ and at least also one of $H_2$, $N_2$, $CH_4$ and/or Ar, to a pressure between 3 and 20 bar, e.g. between 3 and 15 bar, and means for contacting a stream of said pressurized gas mixture (G1), encompassing $H_2S$ and $CO_2$ and at least also one of $H_2$, $N_2$, $CH_4$ and/or Ar, with a stream of water (W2), means for absorption of at least part of said $H_2S$ and $CO_2$ from said pressurized gas mixture (G1), encompassing $H_2S$ and $CO_2$ and at least also one of $H_2$, $N_2$, $CH_4$ and/or Ar, into said water stream (W2), thereby producing a stream of water (W4) enriched with dissolved $H_2S$ and $CO_2$ comparable to said water stream (W2) and a stream of pressurized gas (G3), which has been depleted of $H_2S$ and $CO_2$ compared to said gas mixture (G1), encompassing $H_2S$ and $CO_2$ and at least also one of $H_2$, $N_2$, $CH_4$ and/or Ar, means for transferring said water stream (W4) enriched with dissolved $H_2S$ and $CO_2$:
  either to an injection well for injecting said water stream (W4) into a geological reservoir, or
  to a system for injection of a water stream (W5) into a geological reservoir for use of said water stream (W4) as an aid for pH-regulation of said water stream (W5)

In a particular preferred embodiment of a system according to the present invention said means for means for absorption of at least part of said $H_2S$ and $CO_2$ from said pressurized gas mixture (G1), encompassing $H_2S$ and $CO_2$ and at least also one of $H_2$, $N_2$, $CH_4$ and/or Ar, into said water stream (W2), comprises one or more absorption columns.

It should be noted that the term water can according to the present invention mean fresh water, water from geothermal wells, brine (geothermal water), sea water and the like. Said water source may, thus, be any type of water. Likewise, the $CO_2$ and/or $H_2S$ gas may originate from any source, such as conventional power plants, geothermal power plants, industrial production, gas separation stations or the like.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Hereinafter a number of embodiments of the invention are described, by way of example only, with reference to the drawings, in which.

DESCRIPTION OF EMBODIMENTS

Figures 1, 2:
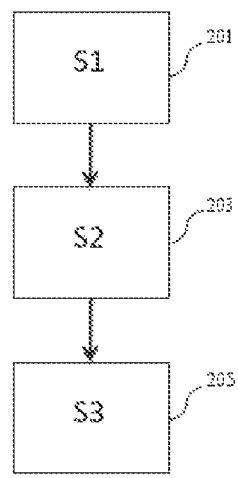
FIG. 1 shows the amount of $CO_2$ and $H_2S$ emitted by various Icelandic geothermal power plants.
FIG. 2 shows a flowchart of a method according to the present invention of separating soluble gases including hydrogen sulfide ($H_2S$) and carbon dioxide ($CO_2$) from a $H_2S$ and $CO_2$ rich gas mixture containing at least also one of $H_2$, $N_2$, $CH_4$ and/or Ar gases, such as NCG.

FIG. 2 shows a flowchart of a method according to the present invention of separating soluble gases including hydrogen sulfide ($H_2S$) and carbon dioxide ($CO_2$) from a $H_2S$ and $CO_2$ rich gas mixture containing at least also one of $H_2$, $N_2$, $CH_4$ and/or Ar gases, such as geothermal non-condensable gas (NCG). It should be noted that the $H_2S$ and $CO_2$ rich gas mixture should not be construed as being limited to NCG. However, for simplicity, in the following it will be assumed that the $H_2S$ and $CO_2$ rich gas mixture is NCG, where the NCG may further contain, but is not limited to, one or more gases selected from $H_2$, $N_2$, Ar and $CH_4$.

In step (S1) 201, the $H_2S$ and $CO_2$ gas is separated from the remaining gases contained in the NCG. As will be discussed in more details in relation to FIG. 3, this is preferably performed by conducting the NCG through an absorption column where the $H_2S$ and $CO_2$ becomes dissolved in a liquid, typically water, and in that way separated from the remaining more poorly-soluble $H_2$, $N_2$, $CH_4$ and Ar gases. Subsequently, the resulting water stream comprising dissolved $H_2S$ and $CO_2$ is conducted (S2) 203 to e.g. a re-injection well for disposal/storage (S3) 205 or into another process for pH modification.

Figure 3:
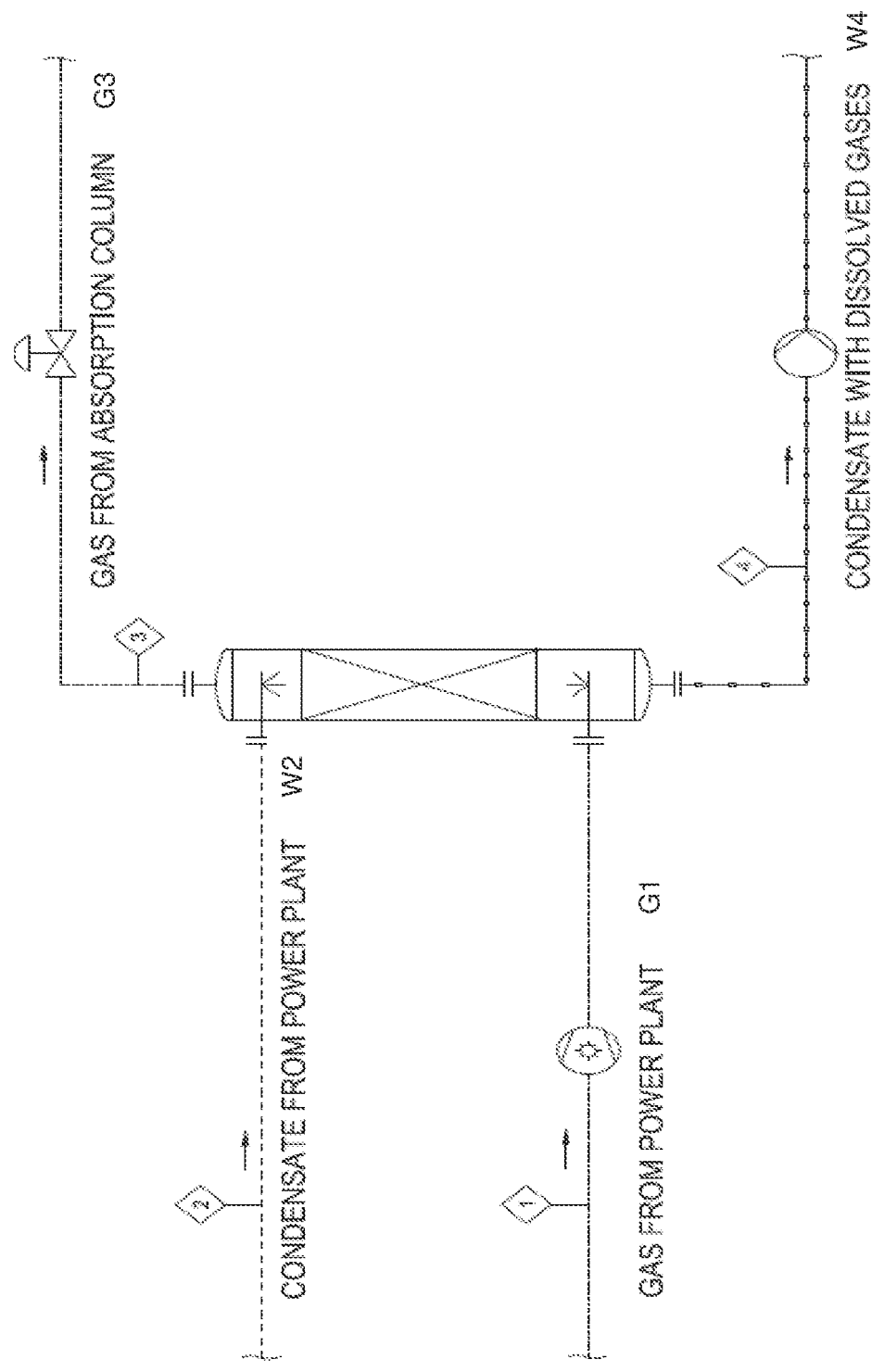
FIG. 3 shows a system according to the present invention for separating soluble gases including hydrogen sulfide ($H_2S$) and carbon dioxide ($CO_2$) from a $H_2S$ and $CO_2$ rich gas mixture containing at least also one of $H_2$, $N_2$, $CH_4$ and/or Ar gases, such as NCG.

Referring to FIG. 3 the present invention in particular relates to a method for abating hydrogen sulfide ($H_2S$) and carbon dioxide ($CO_2$) from a gas mixture (G1), encompassing $H_2S$ and $CO_2$ and at least also one of $H_2$, $N_2$, $CH_4$ and/or Ar, comprising the steps of:
  pressurizing said gas mixture (G1), encompassing $H_2S$ and $CO_2$ and at least also one of $H_2$, $N_2$, $CH_4$ and/or Ar, and
  contacting a stream of said pressurized gas mixture (G1), encompassing $H_2S$ and $CO_2$ and at least also one of $H_2$, $N_2$, $CH_4$ and/or Ar, with a stream of water (W2),
  absorption of at least part of said $H_2S$ and $CO_2$ from said pressurized gas mixture (G1), encompassing $H_2S$ and $CO_2$ and at least also one of $H_2$, $N_2$, $CH_4$ and/or Ar, into said water stream (W2), thereby
  producing a stream of water (W4) enriched with dissolved $H_2S$ and $CO_2$ comparable to said water stream (W2) and a stream of pressurized gas (G3), which has been depleted of $H_2S$ and $CO_2$ compared to said gas mixture (G1), encompassing $H_2S$ and $CO_2$ and at least also one of $H_2$, $N_2$, $CH_4$ and/or Ar,
  transferring said water stream (W4) enriched with dissolved $H_2S$ and $CO_2$:
    either to an injection well for injecting said water stream (W4) into a geological reservoir, or
    to a system for injection of a water stream (W5) into a geological reservoir for use of said water stream (W4) as an aid for pH-regulation of said water stream (W5)

The steps of transferring said water stream (W4) enriched with dissolved $H_2S$ and $CO_2$ either to an injection well for injecting said water stream (W4) into a geological reservoir, or to a system for injection of a water stream (W5) into a geological reservoir for use of said water stream (W4) as an aid for pH-regulation of said water stream (W5) are not shown in FIG. 3.

Figure 4:
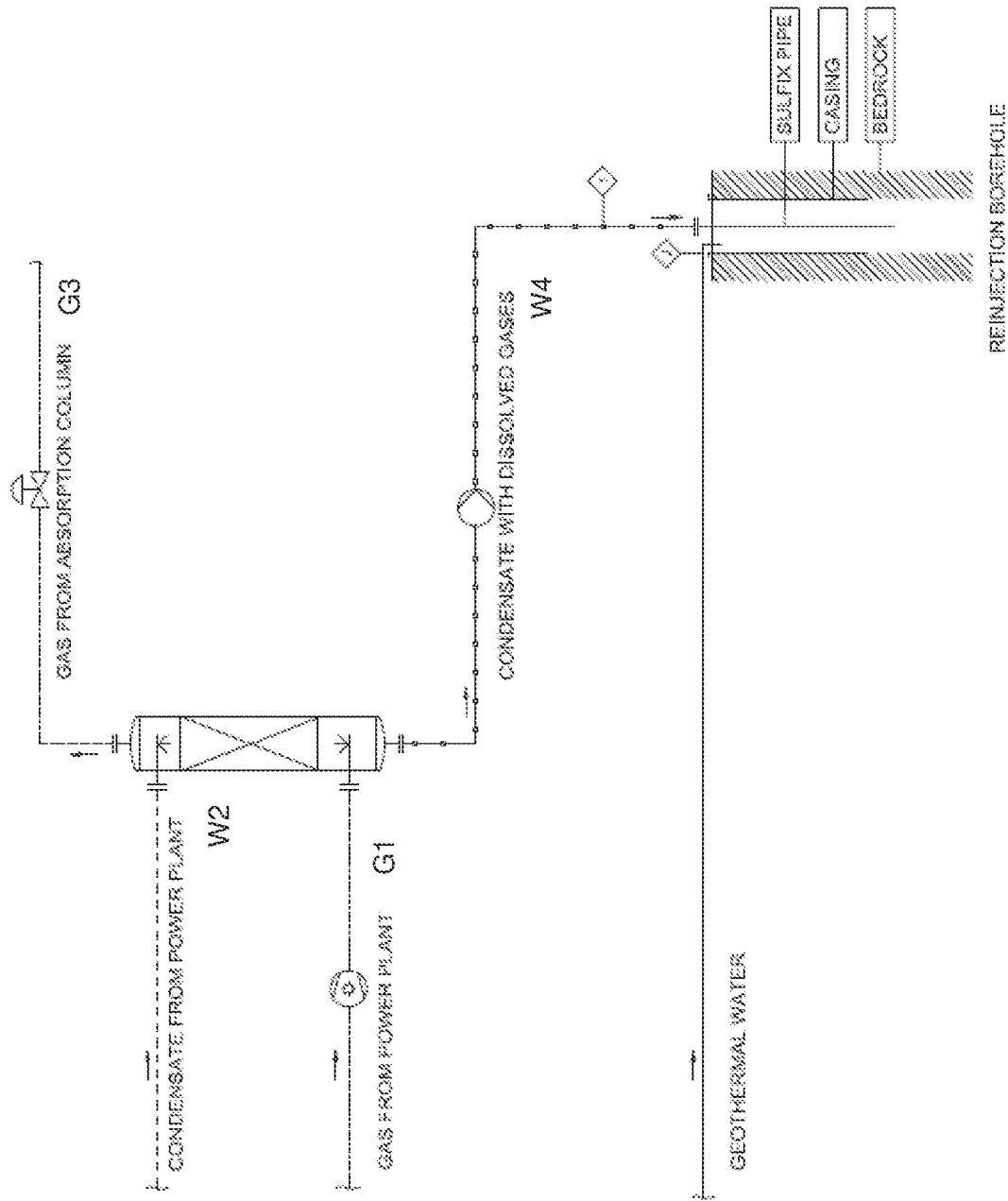
FIG. 4 shows an absorption column and a re-injection well in accordance with a system and a method according to the present invention

The step of transferring said water stream (W4) enriched with dissolved $H_2S$ and $CO_2$ to an injection well for injecting said water stream (W4) into a geological reservoir is shown in FIG. 4. In the particular embodiment shown in FIG. 4, the water stream (W4) is co-injected with another water stream labelled "Geothermal water".

Figure 5:
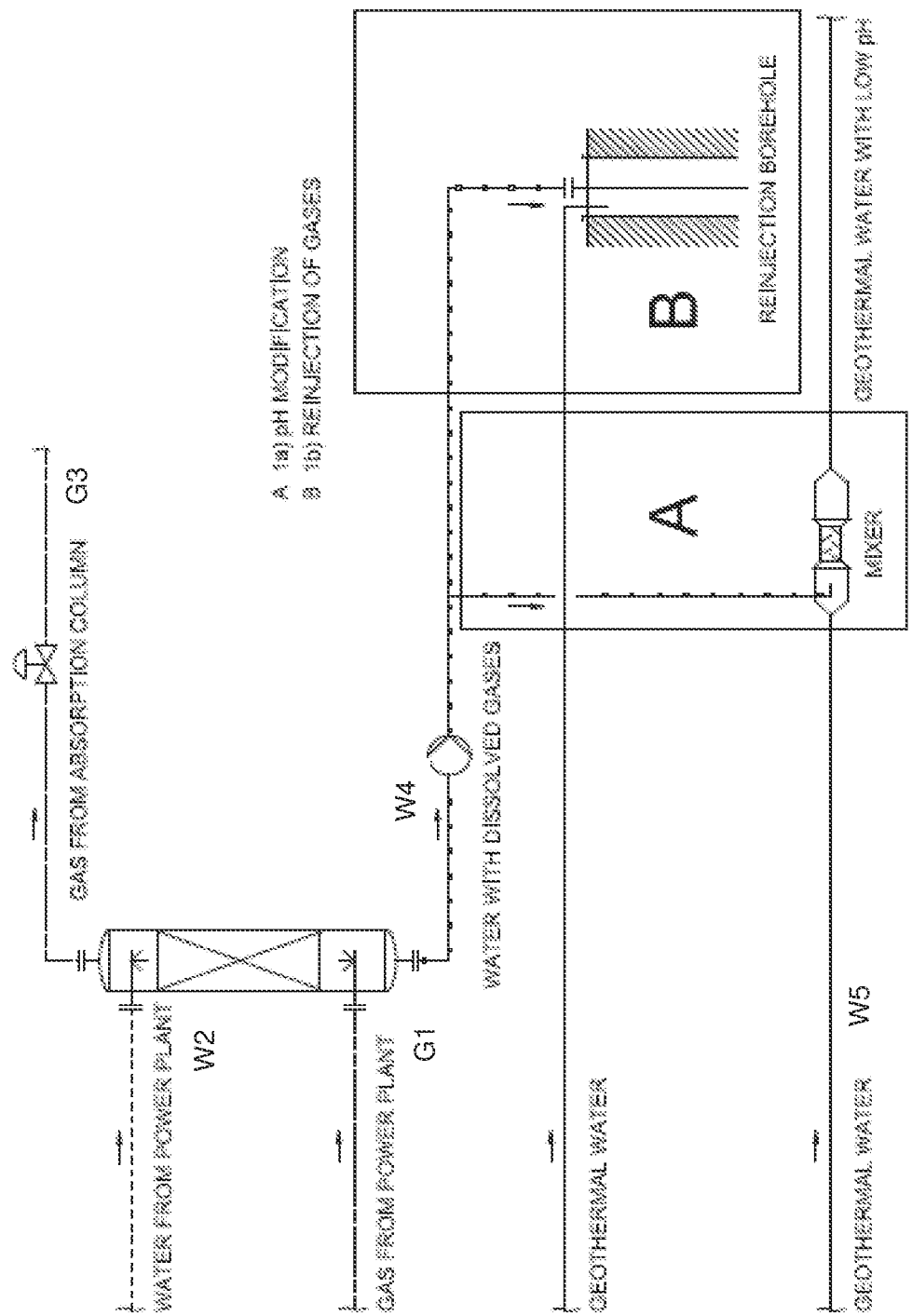
FIG. 5 shows a method for abating $CO_2/H_2S$ in accordance with the present invention (in an absorption column at 5-6 bar) followed by use either for (1a) re-injection as an aid in pH modification, or for (1b) re-injection into a geological reservoir.

The use of water stream (W4) for pH-modification of water stream (W5) is not shown in FIG. 3 or 4, but is shown in e.g. FIG. 5, where part of water stream (W4) is used for re-injection (1b) and part is used for pH-modification (1a) of the water stream (W5), which is marked as "Geothermal water".

In a particularly preferred embodiment of a method according to the present invention the pressure of said pressurized gas mixture (G1), encompassing $H_2S$ and $CO_2$ and at least also one of $H_2$, $N_2$, $CH_4$ and/or Ar, is between 3 and 20 bar, such as between 3 and 15 bar, or between 4 and 20 bar, such as between 4 and 14 bar, such as between 5 and 13 bar, such as 6 and 12 bar, such as 7 and 11 bar, e.g. 7, 8, 9, 10 and 11 bar.

In a further particularly preferred embodiment of a method according to the present invention the temperature of said gas stream (G1) is between 30 and 50° C., such as between 32 and 48° C., such as between 33 and 47° C., such as between 34 and 46, such as between 35 and 45, such as between 36 and 44, such as between 37 and 43, such as between 38 and 42 such as 39, 40 and 41° C.

In a further particularly preferred embodiment of a method according to the present invention the temperature of said water stream (W2) is between 4 and 40° C., such as between 6 and 35° C., such as between 8 and 30° C., such as between 10 and 25° C., such as between 11 and 24° C., such as between 12 and 23° C., such as between 13 and 22° C., such as between 14 and 21° C., such as between 15 and 20° C., such as 15, 16, 17, 18, 19 and 20° C.

In a further particularly preferred embodiment of a method according to the present invention the pressure of said water stream (W2) is between 6 and 23 bar, such as between 6 and 22 bar, such as between 6 and 21 bar, such as between 6 and 20 bar, such as between 6 and 19 bar, such as between 6 and 18 bar, such as between 7 and 17 bar, such as between 8 and 16 bar, such as 9 and 15 bar, such as 10 and 14 bar, e.g. 9, 10, 11, 12, 13 and 14 bar. In a particularly preferred embodiment of a method according to the present invention the pressure of said water stream (W2) is app. 2 to 5 bar above the pressure of said pressurized gas mixture (G1), encompassing $H_2S$ and $CO_2$ and at least also one of $H_2$, $N_2$, $CH_4$ and/or Ar, such as 3 or 4 bar above the pressure of said pressurized gas mixture (G1), encompassing $H_2S$ and $CO_2$ and at least also one of $H_2$, $N_2$, $CH_4$ and/or Ar. Thus, if the pressure of said pressurized gas mixture (G1), encompassing $H_2S$ and $CO_2$ and at least also one of $H_2$, $N_2$, $CH_4$ and/or Ar, is app. 6 bar the pressure of said water stream (W2) should preferably be app. 9 bar. Nonetheless, A skilled person will recognize that the optimal pressure difference between the pressures of said pressurized gas mixture (G1), encompassing $H_2S$ and $CO_2$ and at least also one of $H_2$, $N_2$, $CH_4$ and/or Ar, and said water stream (W2) will depend on e.g. the column height of the applicable absorption column and the pressure drop in the applicable water distribution system, just like it will depend on where in a given system said pressures are measured.

In a further particularly preferred embodiment of a method according to the present invention the flow of said gas mixture (G1) is between 0.2 and 1.5 kg/s, such as between, kg/s 0.25 and 1.45 kg/s, such as between 0.3 and 1.4 kg/s, such as between 0.35 and 1.35 kg/s, such as between 0.4 and 1.3, such as between 0.45 and 1.25 kg/s, such as between 0.5 and 1.2 kg/s, such as between 0.55 and 1.15 kg/s, such as between 0.6 and 1.1 kg/s, such as between 0.65 and 1.05 kg/s, such as between 0.7 and 1 kg/s, such as 0.7, 0.75, 0.8, 0.85, 0.9, 0.95 and 1 kg/s.

In a further particularly preferred embodiment of a method according to the present invention the flow of said water stream (W2) is between 36 and 56 kg/s, such as between 37 and 55 kg/s, such as between 38 and 54 kg/s, such as between 39 and 55 kg/s, such as between 40 and 53 kg/s, such as between 41 and 52 kg/s, such as between 42 and 51 kg/s such as 42, 43, 44, 45, 46, 47, 48, 49 and 50 kg/s.

In a further particularly preferred embodiment of a method according to the present invention said gas mixture (G1) is a geothermal non-condensable gas mixtures (NCG).

Also, apart from the above-mentioned methods the present invention also in particular relates to a system for abating hydrogen sulfide ($H_2S$) and carbon dioxide ($CO_2$) from a gas mixture (G1), encompassing $H_2S$ and $CO_2$ and at least also one of $H_2$, $N_2$, $CH_4$ and/or Ar, comprising the at least the following:

means for pressurizing said gas mixture (G1), encompassing $H_2S$ and $CO_2$ and at least also one of $H_2$, $N_2$, $CH_4$ and/or Ar, and means for contacting a stream of said pressurized gas mixture (G1), encompassing $H_2S$ and $CO_2$ and at least also one of $H_2$, $N_2$, $CH_4$ and/or Ar, with a stream of water (W2), means for absorption of at least part of said $H_2S$ and $CO_2$ from said pressurized gas mixture (G1), encompassing $H_2S$ and $CO_2$ and at least also one of $H_2$, $N_2$, $CH_4$ and/or Ar, into said water stream (W2), thereby producing a stream of water (W4) enriched with dissolved $H_2S$ and $CO_2$ comparable to said water stream (W2) and a stream of pressurized gas (G3), which has been depleted of $H_2S$ and $CO_2$ compared to said gas mixture (G1) encompassing $H_2S$ and $CO_2$ and at least also one of $H_2$, $N_2$, $CH_4$ and/or Ar, means for transferring said water stream (W4) enriched with dissolved $H_2S$ and $CO_2$:

either to an injection well for injecting said water stream (W4) into a geological reservoir, or to a system for injection of a water stream (W5) into a geological reservoir for use of said water stream (W4) as an aid for pH-regulation of said water stream (W5)

In a particular preferred system according to the present invention said means for contacting a stream of said pressurized gas mixture (G1), encompassing $H_2S$ and $CO_2$ and at least also one of $H_2$, $N_2$, $CH_4$ and/or Ar, with a stream of water (W2), and means for absorption of at least part of said $H_2S$ and $CO_2$ from said pressurized gas mixture (G1), encompassing $H_2S$ and $CO_2$ and at least also one of $H_2$, $N_2$, $CH_4$ and/or Ar, into said water stream (W2), thereby producing a stream of water (W4) enriched with dissolved $H_2S$ and $CO_2$ comparable to said water stream (W2) and a stream of pressurized gas (G3), which has been depleted of $H_2S$ and $CO_2$ compared to said gas mixture (G1), encompassing $H_2S$ and $CO_2$ and at least also one of $H_2$, $N_2$, $CH_4$ and/or Ar, are an absorption column.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

EXAMPLES

Example 1

Experimental injection of $CO_2/H_2S$ was carried out at Hellisheidi Power plant located on the Hengill central volcano, which is located in the western volcanic zone SW-Iceland, approximately 20 km southeast of Reykjavik. Currently the Hengill area has two producing geothermal fields, Nesjavellir in the northern part and Hellisheidi in the southern part of the area.

63 production wells have been drilled into the Hellisheidi geothermal field providing valuable information about its stratigraphy and alteration zones. The sub-surface basaltic strata in the Hengill area comprise mostly hyaloclastite volcanic formations down to some 1000 m below sea level depth and underlain by a more dominant lava succession as reported in the scientific literature by Franzson et al., Franzson, H., Kristjánsson, B. R., Gunnarsson, G., Bjornsson, G., Hjartarson, A., Steingrímsson, B., Gunnlaugsson, E. and Gíslason, G. (2005) *The Hengill-Hellisheidi Geothermal field. Development of a Conceptual Model. Proceedings World Geothermal Congress* 2005, hereby incorporated in it's entirety by reference. Hydrothermal alteration ranges from fresh rocks in the overlying cold groundwater system through zeolite assemblage and into high-temperature mineral assemblage including epidote, wollastonite and actinolite as reported in the scientific literature by Helgadóttir et al., Helgadóttir, H. M., Snæbjörnsdóttir, S. O., Níelsson, S., Gunnarsdóttir, S. H., Matthíasdóttir, T., Hardarson, B. S., Gunnlaugur M. Einarsson, G. M. and Franzson, H. (2010) *Geology and Hydrothermal Alteration in the Reservoir of the Hellisheidi High Temperature System, SW-Iceland. Proceedings, World Geothermal Congress* 2010, hereby incorporated in it's entirety by reference.

Geothermal gas from Hellisheidi geothermal field consists primarily of $CO_2$, $H_2S$, $H_2$ and to a lesser degree of $N_2$, $CH_4$ and Ar. A pilot gas separation station was built next to Hellisheidi power plant. The pilot station separated the geothermal gas coming from the condensers of the power plant into a $CO_2$ and $H_2S$ rich gas stream (or streams) and a gas stream comprising the other gases (primarily $H_2$, $N_2$, Ar, $O_2$ and/or $CH_4$). The oxygen in the gas stream separated from the $CO_2$ and $H_2S$ comes from atmospheric contamination of the geothermal gas. Approximately 3% of the total geothermal gas coming from the power station was separated in this way. The $CO_2/H_2S$ gas stream(s) was used for the $CO_2/H_2S$ injection, whereas the remaining gases where released into the atmosphere along with rest of the geothermal gases coming from the condensers of Hellisheidi power plant.

The $CO_2/H_2S$ gas stream(s) was (were) dissolved in groundwater together with potassium iodide tracer close to the injection site and subsequently injected back into the geothermal reservoir. The aim of the project was to use the same governing parameter that are controlling concentrations of e.g. $H_2S$ in the geothermal reservoir to remove $H_2S$ from solution and store it in minerals in the geothermal reservoir.

The site chosen for the experimental injection of hydrogen sulfide and carbon dioxide is in Sleggjubeinsdalur approximately 2 km northeast of Hellisheidi Power Plant. It was chosen on the basis of favorable reservoir temperature, proximity to the power plant and therefore the source of $H_2S$, tracer tests and the fact that on the site high temperature liquid enthalpy wells were available for injection experiments. $H_2S$ gas was transported from a pilot gas separation station, dissolved in geothermal water near the injection site and subsequently injected in well HE-08.

HE-08 is a vertical well 2808 m deep drilled in 2003 for production but turned out to be unusable as a production well. This well was selected for injection because during drilling of nearby wells a clear connection between the wells and HE-08 was observed. The connection between the wells was further studied in a tracer test described below.

The stratigraphy and alteration of Hellisheidi geothermal field and the injection site has been reported in the scientific literature by Franzon et al., Franzson, H., Kristjánsson, B. R., Gunnarsson, G., Bjornsson, G., Hjartarson, A., Steingrímsson, B., Gunnlaugsson, E. and Gíslason, G. (2005) *The Hengill-Hellisheidi Geothermal field. Development of a Conceptual Model. Proceedings Worls Geothermal Congress* 2005, and in the scientific literature by Helgadóttir et al., Helgadóttir, H. M., Snæbjörnsdóttir, S. O., Níelsson, S., Gunnarsdóttir, S. H., Matthíasdóttir, T., Hardarson, B. S., Gunnlaugur M. Einarsson, G. M. and Franzson, H. (2010) *Geology and Hydrothermal Alteration in the Reservoir of the Hellisheidi High Temperature System, SW-Iceland. Proceedings, World Geothermal Congress* 2010, hereby incorporated in its entirety by reference. The main rock formation in the injection site is sub-glacially formed hyoloclastite with occasional lava series. Below around 1400 m below sea level lava series are dominating. Aquifer temperature at the injection site is between 260° and 270° C. as indicated by the application of the quartz geothermometer of the discharged fluid and calculated formation temperature. The dominating aquifer in HE-08 is at 1350 m depth where formation temperature is around 270° C. which is in good agreement with the quartz geothermometer. The rock formation at the injection site go through all typical alteration zones of high temperature areas from fresh rock to epidote-amphibole zone.

During drilling of HE-08 a pressure relationship was observed between HE-08 and KhG-1, which is a nearby well used for water level measurements. During drilling of HE-31, HE-46 and HE-52 pressure relationship was also observed between the drilled well and well HE-8 and KhG-1. Tracer test was performed to reveal and quantify possible flow paths of the $H_2S$ rich geothermal brine (geothermal water) to nearby wells and the result used to compose a monitoring program of the possible monitoring wells.

The tracer test was performed by dissolving 250 kg Na-benzoate ($NaC_6H_5CO_2$) in 1000 liters water followed by injection into well HE-8. After injection of the tracer geothermal brine (geothermal water) was pumped in the well at volumetric flow rate of 4 l/s for 56 days. Wells in the vicinity of the injection well were discharging at the time of the test. The wells were HE-5, HE-31, HE-46 and HE-52. Periodically samples were collected either from their weirbox or with the use of Webre separator and analyzed for the benzoate ion using an ion chromatograph. The concentration of benzoate was under the detection limit in all the samples for wells HE-52, HE-5 and HE-31. Elevated levels of benzoate concentration were only evident in well HE-46. Modeling of the tracer test revealed that close to 40% of the injected water discharged into well HE-46 when taking into account the reported 20% breakdown of benzoate in two weeks at 270° C. The rest of the benzoate was not accounted for. The benzoate injected into HE-08 started to appear in HE-46 after only two days revealing a fast flow path between the two wells. According to the quartz geothermometer, the aquifer temperature is 266° C. which is close to the aquifer temperature in HE-08 and all the wells in the vicinity of the injection site.

The concentration of hydrogen sulfide in aquifer fluids in Hellisheidi geothermal area has been extensively studied, both as a part of this injection project and as a part of general geochemical monitoring of the well and been reported in the scientific literature by Stefansson et al. and Scott et al., Stefansson, A., Arnorsson, S., Gunnarsson, I., Kaasalainen, H. and Gunnlaugsson, E. (2011). *The geochemistry and sequestration of H2S into hydrothermal system at Hellisheidi, Iceland. J. Volcanol. Geoth. Res.* 202, 179-188); Scott S., Gunnarsson, I., Stefansson, A. and Gunnlaugsson, E. (2011). *Gas Chemistry of the Hellisheidi Geothermal Field, SW-Iceland. Proceedings 36th Stanford Geothermal Workshop*, hereby incorporated in its entirety by reference. The calculated $H_2S$ concentration in the high temperature aquifer fluids is in the range of 15-264 ppm. The concentration increases with rising temperature and appears to be controlled by mineral buffer assemblages. The majority of data points are close to equilibrium lines for the pyrite, pyrrhotite, prehnite and epidote or pyrite, pyrrhotite and magnetite mineral buffers. Stefansson et al. concluded that $H_2S$ concentration equilibrate to the prehnite bearing mineral assemblage because Icelandic geothermal areas are usually low in magnetite indicating that it is unstable in Icelandic geothermal systems.

The $H_2S$ abatement method of the present invention depends on the rate of the chemical reactions needed to take place for successful $H_2S$ mineralization. The $H_2S$ needs metals to form the secondary minerals to be permanently stored it in the geothermal reservoir. Reaction path modeling indicates that the main factors affecting the capacity of $H_2S$ mineralization are related to the mobility and oxidation state of iron as reported in the scientific literature by Stefánsson et al., Stefansson, A., Arnorsson, S., Gunnarsson, I., Kaasalainen, H. and Gunnlaugsson, E. (2011). *The geochemistry and sequestration of $H_2S$ into hydrothermal system at Hellisheidi, Iceland. J. Volcanol. Geoth. Res.* 202, 179-188, hereby incorporated in its entirety by reference. Above 250° C. the rate mineralization of pyrite is reduced upon formation of epidote resulting in more basaltic rock needed to be dissolved to mineralize the $H_2S$. The optimum temperature for $H_2S$ sequestration would then be below the stability zone of epidote or below approximately 230° C. (see Stefansson et al. reference). The rock formation temperature at the injection site is between 260-270° C. The injected geothermal water containing the dissolved $H_2S$ heats up from 100° C. up to above 260° before entering the monitoring well (HE-46) providing a wide temperature interval for mineralizing the $H_2S$.

Tracer testing of the injection site revealed a direct and fast flow path from the injection well and the monitoring well. The distance between main aquifers is around 450 m. This indicates that the main flow path between the wells is through a fracture in the reservoir which is to be expected in fracture dominated geothermal reservoir like Hellisheidi geothermal field. For the experimental injection to be successful the rate of $H_2S$ mineralization may not be too fast as sulfide minerals might fill up the aquifers in the vicinity of the injection well making it unusable for injection. Circumstances like that would call for measures to slow down the mineralization reaction. These measures might be for example lowering the concentration of $H_2S$ in the injected brine (geothermal water) and therefore lowering the supersaturation of the brine (geothermal water) with respect to the depositing sulfide minerals. On the other hand, the rate of $H_2S$ mineralization might be too slow for any mineralization to take place when the brine (geothermal water) flows from the injection well to the monitoring well. A response to that could be to close down the monitoring well for some time but continue with the injection of $H_2S$. This would increase the retention time in the geothermal reservoir allowing more time for $H_2S$ sequestration.

Example 2

At the Hellisheidi geothermal power plant in Iceland the non-condensable geothermal gases (NCG), mainly consists of three gases: carbon dioxide ($CO_2$), hydrogen sulphide ($H_2S$) and hydrogen ($H_2$). Other gases such as nitrogen ($N_2$), methane ($CH_4$) and argon (Ar) are also part of the NCG gases but only in very small fractions (ref.: http://www.thinkgeoenergy.com/treating-non-condensable-gases-ncg-of-geothermal-plants-experience-by-mannvit/).

The Non-Condensable gas fraction which arises as a result of the condensation process applied to the steam from the geothermal site was directed to an absorption column, where NCGs (mainly $CO_2$, $H_2S$) were dissolved in water under elevated pressure (6-10 bar) at a constant temperature (15° C.-25° C.).

The operational conditions for capturing the water-soluble gases including hydrogen sulfide ($H_2S$) and carbon dioxide ($CO_2$) from the $H_2S$ and $CO_2$ rich geothermal non-condensable gas mixture (NCG), are outlined below:

plant in Iceland, and that given other pre-determined conditions as regards gas flow and temperature these might be different. Similarly, the skilled person will readily appreciate that the relevant water flow should be a certain ratio of the actual gas flow, which should be changed according to the applicable pressures and temperatures.

Example 3

The present set of experiments were also performed at the geothermal plant in Hellisheidi, Iceland.

The subsurface rocks at the injection site consist of olivine tholeiitic basalts which are relatively permeable with an estimated 8-10% porosity and characterized by high permeability fractures at depths below 800 m. The temperature at ~2000 m depth of the target acid gas storage reservoir ranges from 220 to 260° C.

The $CO_2$ and $H_2S$ were dissolved in water and the mixture was released at a depth of 750 m. The $CO_2/H_2S/H_2O$ mixture was carried from the release point via an injection well extending down to 1900-2200 m where it was released to the subsurface rocks. This combined fluid then flowed down a hydraulic pressure gradient to monitoring wells located 0.9-1.5 km from the injection well at 1900-2200 m depth.

During a 1 year period a total of 4526 tons of $CO_2$ and 2536 tons of $H_2S$ was injected. The fate of the injected gas mixture was monitored by the regular sampling of three monitoring wells, located 984 m, 1356 m, and 1482 m downstream from the injection well at the depths of a main aquifers, of about 1900-2200 m depth. At these depths, the reservoir fluid is a single-phase aqueous fluid with a temperature of 266 to 277° C., as the hydrostatic pressure is greater than the liquid-vapor saturation pressure of water. As the fluid rises up the monitoring wells, it boils as the pressure decreases. Consequently, steam and water are sampled separately at 5.7 to 9.3 bars at the top of each monitoring well.

| | 1 | 2 | 3 | 4 |
|---|---|---|---|---|
| | | Stream name | | |
| | Geothermal gas from power plant | Water from power plant | Gas from absorption column | water with dissolved gases |
| | | Operation | | |
| Temp [° C.] | 40 | 15 | 15.2 | 15.5 |
| Pressure [bara] | 1 | 6 | 6 | 6 |
| Flow liquid [kg/s] | 0 | 50 | 0 | 50.54 |
| Flow gas [kg/s] | 0.8 | 0 | 0.26 | 0 |
| | | Range: | | |
| Temp [° C.] | 39-41 | 15-20 | 15.2-20.2 | 15.5-20.5 |
| Pressure [bara] | 0.9-1.05 | 5-6 | 5-6 | 5-6 |
| Flow liquid [kg/s] | 0 | 36-56 | 0 | 50.2-55.4 |
| Flow gas [kg/s] | 0.4-0.8 | 0 | 0.26 | 0 |

Up to 98% of the hydrogen sulfide and about 50% of the carbon dioxide was dissolved in the water and re-injected deep into the bedrock at the plant site where $H_2S$ and $CO_2$ mineralize (ref.: http://www.thinkgeoenergy.com/treating-non-condensable-gases-ncg-of-geothermal-plants-experience-by-mannvit/).

The skilled person will readily appreciate that the above-mentioned temperatures, flows and pressures are based on the specific conditions of the Hellisheidi geothermal power Samples for the determination of dissolved inorganic carbon (DIC) and hydrogen sulfide ($H_2S$), as well as $CO_2$, and $H_2S$ in the vapor phase were collected and analysed as described by Arnórsson et al. (2006) Geofluids 6, 203-216.

The fraction of the injected gas mineralization was computed by comparing measured aqueous DIC and dissolved sulfur (DS) concentrations in the sampled monitoring wells to those calculated assuming only mixing and dilution and no reactions occurred in the subsurface.

The difference between the calculated and the measured DIC and DS showed that over 50% of the injected $CO_2$ and 76% of the injected $H_2S$ were mineralized.

Example 4

The present set of experiments were also performed at the geothermal plant in Hellisheidi, Iceland. The system was operated under the conditions described in example 2.

During 153 days, water with dissolved $CO_2$ (4095-6388 mg/l) and $H_2S$ (1933 to 3811) at the flow rate of 0.9-1.4 l/s were used for pH modification geothermal brine (geothermal water) stream at 18-20 l/s. The concentration $CO_2$ and $H_2S$ of the pH modified brine (geothermal water) was between 254-448 mg/l and 170-305 mg/l, respectively with a pH between 5.5 to 6.7. The mixture with a temperature of 117° C. was transferred through a heat exchanger and cooled to 60° C. and the pressure drop across the exchanger was monitored and the amount of scaling estimated by weighing the heat exchanger before and after the experiment. No pressure drop was observed across the heat exchanger and measured scaling was 2 µg/l. For comparison, untreated geothermal brine (geothermal water) was transferred through the heat exchanger for 53 at the same flow rate and temperature drop. The experiment could not be extended further since the heat exchanger clogged with measured scaling of 111 µg/l.

The invention claimed is:

1. A method for abating at least part of hydrogen sulfide ($H_2S$) and at least 50% of carbon dioxide ($CO_2$) present in a Non-Condensable gas (NCG) mixture (G1), encompassing $H_2S$ and $CO_2$ and at least also one of $H_2$, $N_2$, $CH_4$ and/or Ar, comprising the steps of:

pressurizing said NCG mixture (G1), encompassing $H_2S$ and $CO_2$ and at least also one of $H_2$, $N_2$, $CH_4$ and/or Ar, to a pressure between 6 and 20 bar, and contacting a stream of said pressurized NCG mixture (G1), encompassing $H_2S$ and $CO_2$ and at least also one of $H_2$, $N_2$, $CH_4$ and/or Ar, with a stream of water (W2) having a pressure between 6 and 23 bar, wherein a flow ratio, as measured in kg/s, of the stream of water (W2) to the stream of gas mixture (G1) is from 36:1.5 to 56:0.2, absorption of at least part of said $H_2S$ and at least 50% of said $CO_2$ from said pressurized NCG mixture (G1), encompassing $H_2S$ and $CO_2$ and at least also one of $H_2$, $N_2$, $CH_4$ and/or Ar, into said water stream (W2), thereby separating said at least part of said $H_2S$ and at least 50% of said $CO_2$ from at least part of said at least also one of $H_2$, $N_2$, $CH_4$ and/or Ar and producing a stream of water (W4) enriched with dissolved $H_2S$ and $CO_2$ comparable to said water stream (W2) and a stream of pressurized gas (G3), which has been depleted of at least part of the $H_2S$ and at least 50% of the $CO_2$ compared to said NCG mixture (G1), encompassing $H_2S$ and $CO_2$ and at least also one of $H_2$, $N_2$, $CH_4$ and/or Ar, transferring said water stream (W4) enriched with dissolved $H_2S$ and $CO_2$:

either to an injection well for injecting said water stream (W4) into a geological reservoir, or to a system for injection of a water stream (W5) into a geological reservoir for use of said water stream (W4) as an aid for pH-regulation of said water stream (W5).

2. The method according to claim 1, wherein the pressure of said pressurized NCG mixture (G1), encompassing $H_2S$ and $CO_2$ and at least also one of $H_2$, $N_2$, $CH_4$ and/or Ar, is between 6 and 12 bar.

3. The method according to claim 1, wherein said NCG mixture (G1), encompassing $H_2S$ and $CO_2$ and at least also one of $H_2$, $N_2$, $CH_4$ and/or Ar, has a temperature of between 30 and 60° C.

4. The method according to claim 1, wherein said water stream (W2) has a temperature of between 4 and 40° C.

5. The method according to claim 1, wherein the flow of said NCG mixture (G1), encompassing $H_2S$ and $CO_2$ and at least also one of $H_2$, $N_2$, $CH_4$ and/or Ar, is between 0.2 and 1.5 kg/s.

6. The method according to claim 1, wherein the flow of said water stream (W2) is between 36 and 56 kg/s.

7. The method according to claim 1, wherein said NCG mixture (G1), encompassing $H_2S$ and $CO_2$ and at least also one of $H_2$, $N_2$, $CH_4$ and/or Ar, is a geothermal non-condensable gas mixture.

8. The method according to claim 1, wherein the pressure of said pressurized NCG mixture (G1) is between 7 and 11 bar.

9. The method according to claim 1, wherein the pressure of said pressurized NCG (G1) mixture is 7, or 8, or 9, or 10 or 11 bar.

10. The method according to claim 1, wherein said NCG mixture (G1) has a temperature of between 35 and 50° C.

11. The method according to claim 1, wherein said NCG mixture (G1) has a temperature of between 39 and 41° C.

12. The method according to claim 1, wherein said NCG mixture (G1) has a temperature of 40° C.

13. The method according to claim 1, wherein said water stream (W2) has a temperature of between 6 and 35° C.

14. The method according to claim 1, wherein said water stream (W2) has a temperature of between 8 and 30° C.

15. The method according to claim 1, wherein said water stream (W2) has a temperature of between 10 and 25° C.

16. The method according to claim 1, wherein said water stream (W2) has a temperature of between 12 and 20° C.

17. The method according to claim 1, wherein said water stream (W2) has a temperature of between 13 and 17° C.

18. The method according to claim 1, wherein said water stream (W2) has a temperature of 15° C.

19. The method according to claim 1, wherein the flow of said NCG mixture (G1) is between 0.25 and 1.45 kg/s.

20. The method according to claim 1, wherein the flow of said NCG mixture (G1) is between 0.4 and 1.4 kg/s.

21. The method according to claim 1, wherein the flow of said NCG mixture (G1) is 1 kg/s.

22. The method according to claim 1, wherein the flow of said water stream (W2) is between 45 and 55 kg/s.

23. The method according to claim 1, wherein the flow of said water stream (W2) is between 48 and 52 kg/s.

24. The method according to claim 1, wherein the flow of said water stream (W2) is 50 kg/s.

25. A system configured to abate at least part of hydrogen sulfide ($H_2S$) and at least 50% of carbon dioxide ($CO_2$) present in a Non-Condensable gas (NCG) mixture (G1), encompassing $H_2S$ and $CO_2$ and at least also one of $H_2$, $N_2$, $CH_4$ and/or Ar, wherein the system is configured to:

pressurize-said NCG mixture (G1), encompassing $H_2S$ and $CO_2$ and at least also one of $H_2$, $N_2$, $CH_4$ and/or Ar, to a pressure between 6 and 20 bar, and contact a stream of said pressurized NCG mixture (G1), encompassing $H_2S$ and $CO_2$ and at least also one of $H_2$, $N_2$, $CH_4$ and/or Ar, with a stream of water (W2) having a pressure between 6 and 23 bar, wherein a flow ratio, as measured in kg/s, of the stream of water (W2) to the stream of gas mixture (G1) is from 36:1.5 to 56:0.2, absorb at least part of said $H_2S$ and at least 50% of said $CO_2$ from said pressurized NCG mixture (G1), encompassing $H_2S$ and $CO_2$ and at least also one of $H_2$, $N_2$, $CH_4$ and/or Ar, into said water stream (W2), thereby separating said at least part of said $H_2S$ and at least 50% of said $CO_2$ from at least part of said at least also one of $H_2$, $N_2$, $CH_4$ and/or Ar and producing a stream of water (W4) enriched with dissolved $H_2S$ and $CO_2$ comparable to said water stream (W2) and a stream of pressurized gas (G3), which has been depleted of at least part of the $H_2S$ and at least 50% of the $CO_2$ compared to said NCG mixture (G1), encompassing $H_2S$ and $CO_2$ and at least also one of $H_2$, $N_2$, $CH_4$ and/or Ar, transfer-said water stream (W4) enriched with dissolved $H_2S$ and $CO_2$:
  either to an injection well for injecting said water stream (W4) into a geological reservoir, or
  to a system for injection of a water stream (W5) into a geological reservoir for use of said water stream (W4) as an aid for pH-regulation of said water stream (W5).

26. The system according to claim 25 wherein the system is configured to:
  contact, in an absorption column, the stream of said pressurized NCG mixture (G1), encompassing $H_2S$ and $CO_2$ and at least also one of $H_2$, $N_2$, $CH_4$ and/or Ar, with the stream of water (W2), and
  absorb, in the absorption column, at least part of said $H_2S$ and at least 50% of said $CO_2$ from said pressurized NCG mixture (G1), encompassing $H_2S$ and $CO_2$ and at least also one of $H_2$, $N_2$, $CH_4$ and/or Ar, into said water stream (W2), thereby separating said at least part of said $H_2S$ and at least 50% of said $CO_2$ from at least part of said at least also one of $H_2$, $N_2$, $CH_4$ and/or Ar and producing the stream of water (W4) enriched with dissolved $H_2S$ and $CO_2$ comparable to said water stream (W2) and the stream of pressurized gas (G3), which has been depleted of at least part of the $H_2S$ and least 50% of the $CO_2$ compared to said NCG mixture (G1), encompassing $H_2S$ and $CO_2$ and at least also one of $H_2$, $N_2$, $CH_4$ and/or Ar.

* * * * *